US006921566B2

(12) United States Patent
Lipstein

(10) Patent No.: US 6,921,566 B2
(45) Date of Patent: Jul. 26, 2005

(54) CUSHIONED GRIP TAPE

(76) Inventor: Evan Lipstein, 309 E. 87th St., Apt. 7R, New York, NY (US) 10128

( * ) Notice: Subject to any disclaimer, the term of this patent is extended or adjusted under 35 U.S.C. 154(b) by 0 days.

(21) Appl. No.: 10/840,543

(22) Filed: May 6, 2004

(65) Prior Publication Data

US 2004/0229016 A1 Nov. 18, 2004

Related U.S. Application Data

(60) Provisional application No. 60/469,631, filed on May 12, 2003.

(51) Int. Cl.⁷ ................................................. B32B 3/00
(52) U.S. Cl. .................... 428/40.1; 428/40.2; 428/41.9; 428/150; 428/317.1; 428/317.3; 428/908.8; 451/533; 451/534; 451/539
(58) Field of Search ............................... 428/40.1, 40.2, 428/41.3, 41.9, 150, 317.1, 317.3, 908.8; 451/533, 534, 539

(56) References Cited

U.S. PATENT DOCUMENTS

| 4,336,293 A | * | 6/1982 | Eiden | 428/143 |
| 5,607,745 A | * | 3/1997 | Ogden | 428/138 |
| 5,783,303 A | * | 7/1998 | Tsuei | 428/354 |

* cited by examiner

Primary Examiner—Nasser Ahmad
(74) Attorney, Agent, or Firm—McCormick, Paulding & Huber LLP

(57) ABSTRACT

A multi-layer flexible non-skid cushioning tape having a top layer of plastic material having a frictional surface thereon, an elastomeric cushioning layer comprising a neoprene/EPDM/SBR blend, and an adhesion layer of a plastic sheet with a pressure sensitive adhesive thereon. The layers are laminated together for application to a platform. The cushioning tape provides a vibration-absorbing, non-skid surface with an improved coefficient of friction-resisting slippage.

13 Claims, 2 Drawing Sheets

CUSHIONED GRIP TAPE

CROSS REFERENCE TO RELATED APPLICATIONS

This application claims the benefits of prior filed, co-pending U.S. provisional patent application Ser. No. 60/469,631 filed on May 12, 2003.

BACKGROUND OF THE INVENTION

This invention relates to improvements to grip tape to be adhered to a surface for improving its coefficient of friction as a non-skid surface and for absorbing vibration. More particularly, the invention relates to cushioned grip tape to be applied to a surface to provide a high coefficient of friction and offer fatigue resistance, reduce muscle discomfort and body aches due to fatigue where workers are standing or walking.

Grip tape is old and well known in the prior art. Grip tape typically includes a substantially flat continuous flexible sheet of material covered by or coated with an abrasive material. Such grip tapes are typically adhered to surfaces such as skate boards, scooters, boats, stairs, decks, mopeds, windsurfers or the like for the purpose of preventing a user from slipping on the surface. In some cases, the surface to which the grip tape is applied is subject to vibration which tires the user when standing on the surface for long periods of time, or where the surface is subject to sudden forces that can result in painful impact on the feet of the user.

Flexible sheets with abrasive surfaces adapted for attachment with adhesive are known in the art. For example from Wooster products of Wooster Ohio under the trademark Flex Tread™ anti-slip deck tape and from Minnesota Mining and manufacturing of St. Paul, Minn., under the name Safety-Walk™, anti-slip surface material and from the Jessup Manufacturing Company of McHenry, Ill. under the name Safety Track™ and Flex Track™ Non-Slip tape.

Cushion Matting is also old and well known in the prior art. Cushion matting is often a non-woven floor-covering product made from continuous vinyl filaments or rubber (rubber-like) materials. Cushion matting is used for fatigue resistance and to aid users in standing comfort. For example, such cushion matting may be obtained from Minnesota Mining and Manufacturing of St. Paul, Minn., under the name Safety-Walk™ Cushion Matting 3270.

The prior patent art has disclosed many types of flexible sheets with non-skid surfaces or treads with adhesive backing in order to enable the sheets to be adhered to an underlying surface. Exemplary of such structures are U.S. Pat. No. 3,227,604 issued Jan. 4, 1966 to Morgan and U.S. Pat. No. 3,578,550 issued May 11, 1971 to Hoerner et al.

Cushioning non-skid surfaces have also been suggested in the prior art. U.S. Pat. No. 2,156,871 issued May 2, 1939 to Rittenhouse describes a thin sheet of soft rubber with a fabric backing on one side and a granular friction face on the upper surface composed of haphazardly arranged granules of crystalline form. The granules are individually retained in interstices in the rubber sheet.

Reissue Pat. 25, 778 issued May 18, 1965 to La Bore et al. describes a non-slip covering material in which discreet incompressible resilient non-adhesive particles are randomly distributed throughout a flexible matrix of a rubber-based or rubbery adhesive composition. The matrix is prepared by curing a slurry containing the particles.

U.S. Pat. No. 5,346,759 issued Sep. 13, 1994 to Will shows a decking structure in which one or more layers of elastomeric material are disposed beneath an upper layer of polyethylene coated with aluminum oxide particles. The elastomeric layers are permanently attached to the decking structure.

There has been a long felt need for a cushioned grip tape having a non-skid safety surface with a vibration absorbing cushioning layer and the ability to adhere this composite material to a desired surface using a pressure sensitive adhesive. There has also been a need to improve the coefficient of friction resisting slipping on the surface.

Accordingly, one object of the present invention is to provide an improved cushioned grip tape.

Another object of the present invention is to provide an improved flexible cushioned grip tape for attaching to standing surfaces that will prevent fatigue.

Another object to the present invention is to provide a flexible cushioned grip tape with an improved nonskid surface.

Another object of the invention is to provide a flexible cushioned grip tape which may be easily applied to a surface of any shape or contour.

Still another object of the invention is to provide a flexible cushioned grip tape with a non-skid surface having a higher objective coefficient of friction than an uncushioned non-skid surface.

SUMMARY OF THE INVENTION

Briefly stated, the invention comprises a multi-layer flexible tape having a top layer comprising a sheet of plastic material having a frictional surface thereon, a cushioning layer comprising an elastomer, and an adhesion layer comprising a plastic sheet with a pressure sensitive adhesive thereon adapted for application to a substrate, said top layer being adhered to the cushioning layer with the frictional surface exposed, and the adhesion layer being adhered to the opposite side of the cushioning layer with the pressure sensitive adhesive material exposed. The frictional surface on the top layer may comprise discrete hard or abrasive particles adhered to the surface of the sheet of plastic material, or may comprise a frictional surface embossed into the upper surface of the sheet of plastic material.

In its preferred form, the top layer is either a silicon carbide and aluminum oxide mixture bonded to a PVC sheet, or is a PVC sheet with an embossed frictional surface. The cushioning layer is preferably a neoprene/EPDM (ethylene propylene dyene methylene)/SBR (sponge rubber) blend, and the adhesion layer is a polyester sheet having a high-tack acrylic pressure sensitive adhesive on at least the exposed side thereof. The layers are preferably bonded together with the same acrylic pressure sensitive adhesive, and the exposed pressure sensitive adhesive may be protected before use with a Kraft silicone-coated release liner.

DRAWING

The invention will be better understood by reference to the following description, taken in connection with the accompanying drawings, in which.

DESCRIPTION OF THE PREFERRED EMBODIMENT

Figure 1:
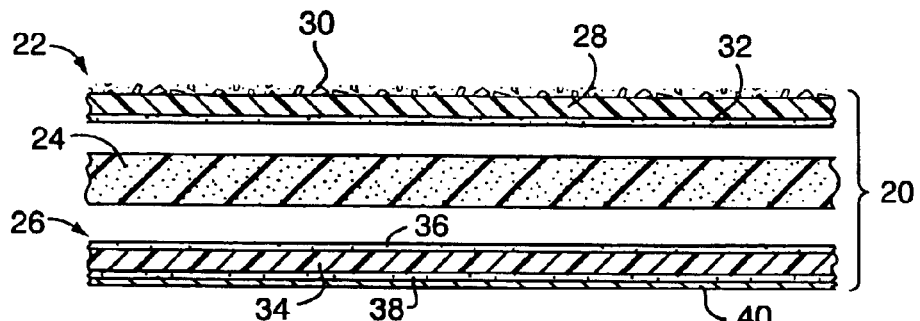
FIG. 1 is a horizontal elevation exploded view of the cushioned grip tape components prior to assembly.

Referring to FIG. 1 of the drawing, an exploded view is shown of a cushioned grip tape assembly, which is designated generally as 20. The exposed upper surface of cushioned grip tape 20 is coated with abrasive grit particles to provide a non-slip traction surface for the user as is already known in the art.

The exploded view is shown of grip tape 20 prior to assembly of the components in the preferred embodiment of the invention. The three components utilized in assembling the cushioned grip tape are shown as a top layer 22, a cushioning layer 24 and an adhesion layer 26.

Top layer 22 is comprised of a flexible plastic sheet 28 having an upper layer of abrasive grit particles 30 on one side and a pressure sensitive adhesive layer 32 on the opposite side. In its preferred form, the flexible plastic sheet is PVC (polyvinyl chloride). Abrasive grit particles are preferably a mixture of aluminum oxide and silicon carbide particles bonded to the PVC sheet. The adhesive layer 32 is preferably an acrylic pressure-sensitive adhesive (PSA).

The top layer 22 may be tailored to fit the application, depending on what environment the cushioned grip tape will be used in. Silicon carbide grit may be commercially obtained in grit size ranging from 60 microns (very fine) to 1200 microns (very coarse). Selection for the application may therefore be guided by the below table.

| Grade | ISO | Microns (range) |
| --- | --- | --- |
| Barefoot | 80 | 212–180 |
| Fine | 46 | 425–355 |
| Industrial | 24 | 850–710 |
| Heavy Duty | 20 | 1180–1000 |

As a substitute for the silicon carbide and aluminum oxide grit mixture, either of these materials may be used alone, or also substitute abrasive grit particles are available such as zirconium, tungsten carbide, cemented carbide or pumice. Assorted colors are also available by mixing pigment or by selection of colored grit materials.

In accordance with the present invention, a cushioning layer 24 of elastomer is preferably neoprene/EPDM (ethylene propylene dyene methylene)/SBR (sponge rubber) blend which provides cushioning, vibration absorption and load-displacement. An alternate satisfactory elastomer for the cushioning layer is EVA foam (ethylene vinyl acetate). However the elastomeric layer may comprise any of the following materials: open cell reinforced silicone, closed cell reinforced silicone, Nitrile, vinyl, PVC sponge, or blown vinyl sponge.

While the preferred cushioning layer is the above-described blend of Neoprene/EPDM/SBR, many other substitutes are commercially available. These include commercially available elastomeric formulations and structures of polyethylene, polyurethane and other cushioning materials. Various densities and thicknesses may be chosen depending upon the application.

The cushioning layer 24 is thicker than the top layer 22, which serves to hold the grit particles and to transfer forces to the elastomer beneath it. Varying thicknesses and densities of foam can be used to offer users more or less cushioning, vibration absorption or dampening—depending upon application or intended usage. The thickness of the elastomeric cushioning layer will vary in a range from $1/16$ inch to $1/2$ inch, but is preferably on the order of $1/8^{th}$ inch if it is composed of the Neoprene/EPDM/SBR blend.

Lastly, adhesion layer 26 is a double coated polyester sheet 34 with high-tack acrylic PSA 36, 38, high peel and high sheer strength which is suitable to laminate dissimilar materials together.

A temporary release liner 40 provides protection for the adhesive until the cushioned grip tape is to be applied to the skateboard platform 12.

The cushioned grip tape 20 is assembled in a process generically referred to as "converting" by laminating top layer 22, cushioning layer 24 and adhesion layer 26 together under pressure to provide a single tape which may then be applied to any suitable surface such as the skateboard 10.

Figure 2:
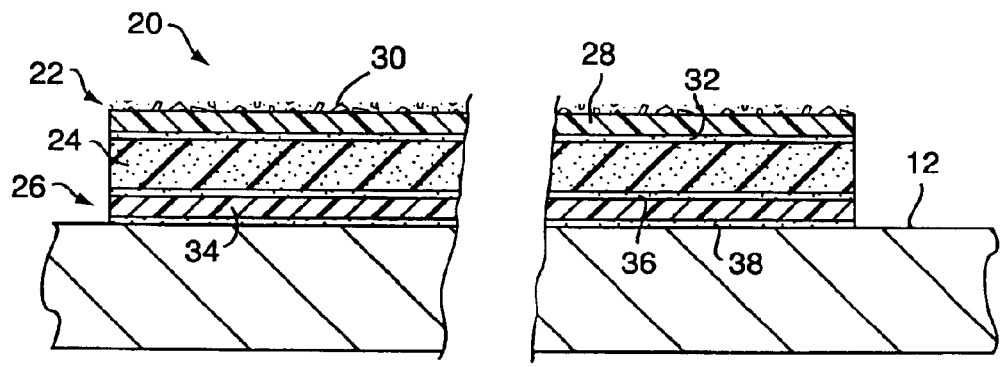
FIG. 2 is a horizontal elevation side view in cross section showing the assembled cushioned grip tape applied to a platform surface.

Referring to FIG. 2 of the drawing, the assembly of cushioned grip tape 20 is shown applied to the platform 12 after first removing release liner 40. The drawing shown in FIG. 2 is not to scale, the thickness of the sheets and size of the grit particles being exaggerated to provide clarity of understanding the structure. While platform 12 is shown as flat in FIG. 2 of the drawing, it may also be contoured and the cushioned grip tape 20 may be cut in any desired shape to conform to the surface rather than being rectangular as it is shown in the drawings.

Figure 3:
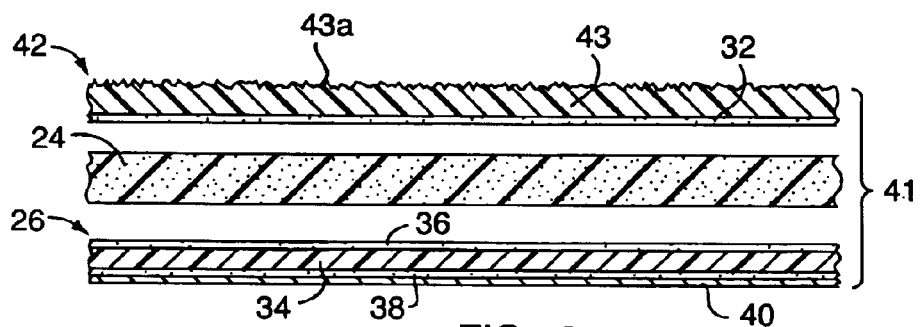
FIG. 3 is a horizontal elevation exploded view of a modified form of the present invention.
Figure 4:
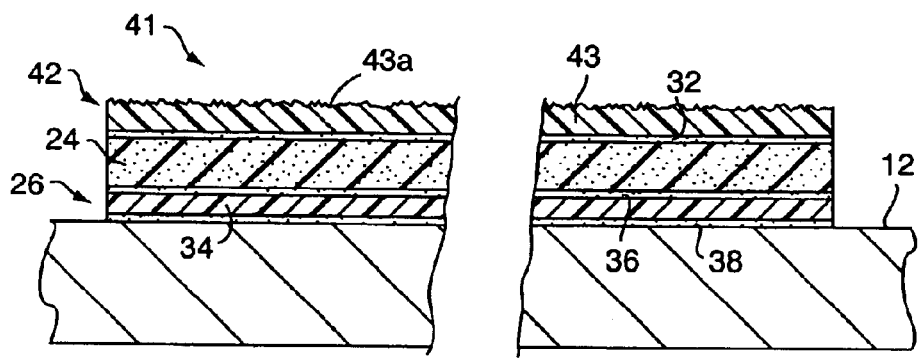
FIG. 4 is a horizontal elevation side view in cross section showing the modified form of the present invention.

Referring to FIGS. 3 and 4 of the drawing, a modified form of the invention is illustrated. The modified cushioned grip tape is identified by reference number 41 in the exploded view of FIG. 3 and the cross-sectional view of FIG. 4. The cushioning layer 24 and the adhesion layer 26 are identical to those previously described in connection with FIG. 1 and FIG. 2. However, the top layer, designated by reference number 42 is constructed in a different manner. Rather than having discrete particles adhered to the upper surface of the plastic sheet, a frictional surface 43a is embossed into a sheet 43 of PVC (polyvinyl chloride) in a process known as calendaring. The calendared surface 43a forms a frictional irregular surface using a random pattern of hills and valleys which can be of irregular depth, so as to increase the sliding coefficient of friction across the surface of the PVC sheet. This provides a less abrasive non-skid frictional surface than the discrete silicon carbide particles used in the construction shown in FIGS. 1 and 2.

Figure 5:
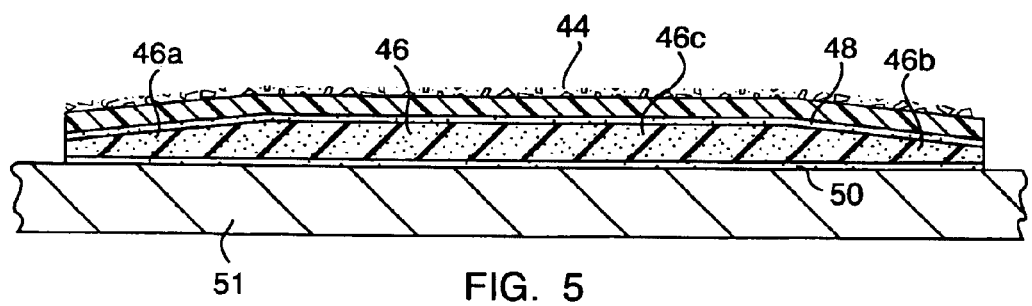
FIG. 5 is a horizontal elevation side view in cross-section of yet another modified form of the invention.

FIG. 5 shows another modified form of the assembled cushioned grip tape applied to a platform 51 by an adhesive layer 50. It will be noted that the increased height of the assembly, due to the layer of elastomeric material could cause an obstruction or hazard along the edges. By modifying or tapering the elastomeric layer, the cushioning layer may be made thinner around the periphery or along the edges to prevent tripping over the edges.

Referring to FIG. 5 of the drawing, it will be seen that the cushioning layer 46 has edges 46a, 46b that are thinner than a center portion 46c. The cushioned grip tape adhered to the platform 51, and the tapered elastomeric layer results in a reduced thickness along the edge where it might otherwise cause an obstruction.

I have discovered that the addition of an elastomeric layer in the cushioned grip tape results in a higher effective coefficient of friction resisting sliding on the surface than the coefficient of friction in an identical uncushioned grip tape. While I do not intend to be bound by the following explanation as to how this takes place, the observed improvement may be explained as follows:

When a vertical force is placed on the cushioned grip tape, the cushioning elastomeric layer is compressed slightly and the top layer conforms in a slightly "dished" shape. To the horizontal vector component representing sliding coefficient of friction is added a vertical vector component. These add vectorially to a resultant vector that is parallel to the friction surface, so as to produce a higher effective coefficient of friction. In other words, it is necessary to slide up and out of the slight depression or "dish" caused by compression of the elastomeric layer.

EXAMPLE

A specimen of cushioned grip tape was prepared in accordance with the present invention and compared with a commercially available uncushioned grip tape to determine the difference, if any, in coefficient of friction.

The specimen of cushioned grip tape (ZORB-GRIP™) comprised a converted composite 4 mm thick laminate of:

1. a 0.8 mm thick top layer of PVC with a grit mixture of silicon carbon and aluminum oxide adhered to it.

2. a 2 mm thick elastomeric cushioning layer of neoprene/EPDM/SBR blend, and 3. a 1.2 mm thick adhesion layer of a polyester sheet with an acrylic pressure sensitive adhesive on it.

The commercially available non-cushioned grip tape (CAN-DO National Tape "non-skid adhesive tape") comprised a 0.8 mm layer of PVC with a grit mixture of silicon carbon and aluminum oxide adhered to it, together with an acrylic pressure sensitive adhesive on it.

Because both materials were relatively thin, it was necessary to place them on top of a 2 cm thick piece of EVA foam when they were tested. The EVA foam was a dense, hard sample with a durometer reading of 70 (Asker C scale). It is a standard sample that is commonly used when footwear inserts are tested. The measured values are the combination of the test material plus the EVA foam.

The friction between the two materials was evaluated in this test. For this test, the materials were those described above in contact with the sole of a common work boot. Linear friction was evaluated by placing a known weight on the shoe and measuring the force required to move the shoe along the surface. The coefficient of friction was then calculated. This test was repeated five times for each material.

The average static coefficient of friction for the ZORB-TAPE™ specimen was 1.2 and the average coefficient of friction for the commercially available uncushioned grip tape was 0.85.

Coefficient of friction is the measure of resistance to movement between two materials. In this case a common work boot outsole and the two materials described above were used. Clearly, there is a higher coefficient of friction between the ZORB-GRIP material and the work boot as the work boot sinks into the ZORB-GRIP material. Given the higher coefficient of friction between the two anti-skid materials, it is clear that, for a floor surface, the ZORB-GRIP would provide a more effective non-skid surface.

Operation

In operation, the invention provides a substantial improvement over known grip tape constructions, due to the addition of a cushioning layer of an elastomer which absorbs shock and vibration and thus reduces fatigue on a person standing on the surface, and improves the non-skid characteristics by increasing the coefficient of friction as noted above.

While the invention has been described for a preferred embodiment and two modifications, other modifications will occur to those skilled in the art. For example, the cushioned grip tape may be assembled directly to a platform or other surface by applying adhesive to both sides of the cushioning layer and adhering a flexible sheet with the above-described abrasive grit particles on one side directly to the elastomer and adhering the elastomer directly to the platform without the use of an adhesion layer. This modification may provide the functional advantages of the invention, but has less flexibility because the cushioned grip tape assembly cannot be handled as a separate article and applied to various surfaces as needed.

Other modifications will occur to those skilled the art and it is desired to secure in the appended claims all such modifications as fall within the true spirit and scope of the invention.

What is claimed is:

1. A multi-layer flexible non-skid tape having a top layer comprising a sheet of plastic material having a grit frictional surface thereon, a cushioning layer comprising an elastomer, selected from the group consisting of a neoprene/EPDM (ethylene propylene dyene methylene)/SBR (sponge rubber) blend and ethylene vinyl acetate foam, and an adhesion layer comprising a plastic sheet with a pressure sensitive adhesive thereon adapted for application to a substrate, said top layer being adhered to the cushioning layer with the grit-bearing side exposed, and the adhesion layer being adhered to the opposite side of the cushioning layer with the pressure sensitive adhesive material exposed, wherein said layers are bonded together with adhesive, wherein the frictional surface comprises a silicon carbide and aluminum oxide mixture bonded to a PVC (polyvinyl chloride) sheet top layer.

2. The multi-layer flexible tape according to claim 1, wherein said top layer comprises the sheet of plastic material with a frictional surface pattern embossed thereon.

3. The multi-layer flexible tape according to claim 1, and further including a Kraft silicone-coated release liner covering said exposed pressure sensitive adhesive.

4. The multi-layer flexible tape according to claim 1, wherein said elastomeric layer is gradually tapered to a lesser thickness on at least one edge thereof.

5. The multi-layer flexible tape according to claim 1, wherein said top layer comprises a silicon carbide and aluminum oxide mixture bonded to the PVC sheet, wherein said mixture is in a grit size ranging from 60 microns to 1200 microns and wherein the cushioning layer is thicker than the top layer and wherein the thickness of the cushioning layer lies in a range between 1/16 inch and 1/2 inch.

6. The multi-layer flexible tape according to claim 1, wherein said top layer comprises a silicon carbide and aluminum oxide mixture mixed with paint pigment and bonded to the PVC sheet.

7. The multi-layer flexible tape according to claim 1, wherein said top layer comprises the PVC sheet having a calendared surface of random hills and valleys embossed therein.

8. A multi-layer flexible non-skid tape having a top layer comprising a sheet of plastic material having a grit frictional surface thereon, a cushioning layer comprising an elastomer selected from the group consisting of a neoprene/EPDM (ethylene propylene dyene methylene)/SBR (sponge rubber) blend and ethylene vinyl acetate foam, and an adhesion layer comprising a polyester sheet having a acrylic pressure sensitive adhesive on at least the exposed side thereof adapted for application to a substrate, said top layer being adhered to the cushioning layer with the grit-bearing side exposed, and the adhesion layer being adhered to the opposite side of the cushioning layer with the pressure sensitive adhesive material exposed, wherein the frictional surface comprises a silicon carbide and aluminum oxide mixture bonded to a PVC (polyvinyl chloride) sheet top layer.

9. The multi-layer flexible tape according to claim 8, wherein said layers are bonded together with said acrylic pressure sensitive adhesive.

10. The multi-layer flexible tape according to claim 8, wherein said top layer comprises the sheet of plastic material with a frictional surface pattern embossed thereon.

11. The multi-layer flexible tape according to claim 8, and further including a Kraft silicone-coated release liner covering said exposed pressure sensitive adhesive.

12. The multi-layer flexible tape according to claim 8, wherein said top layer comprises a silicon carbide and aluminum oxide mixture bonded to the PVC sheet, wherein said mixture is in a grit size ranging from 60 microns to 1200 microns and wherein the cushioning layer is thicker than the top layer and wherein the thickness of the cushioning layer lies in a range between 1/16 inch and 1/2 inch.

13. The multi-layer flexible tape according to claim 8, wherein said top layer comprises a silicon carbide and aluminum oxide mixture mixed with paint pigments and bonded to the PVC sheet.

* * * * *